UNITED STATES PATENT OFFICE.

EDWIN JOHN WATKINS AND WILLIAM HENRY SCREETON, OF LONDON, ENGLAND; SAID WATKINS ASSIGNOR TO EDWIN LLOYD, OF LONDON, ENGLAND.

COMPOSITION FOR CLEANSING PAINTED SURFACES.

SPECIFICATION forming part of Letters Patent No. 723,089, dated March 17, 1903.

Application filed November 14, 1902. Serial No. 131,359. (No specimens.)

*To all whom it may concern:*

Be it known that we, EDWIN JOHN WATKINS and WILLIAM HENRY SCREETON, subjects of the King of Great Britain and Ireland, residing at 540 Green street, Upton Park, London, England, have invented certain new and useful Improvements in Compositions for the Cleansing of Painted, Varnished, or Polished Surfaces and the Like, of which the following is a specification.

This invention relates to a new or improved composition for the cleansing of painted, varnished, or polished surfaces and the like; and it has for its its object to provide a composition which being applied to surfaces such as the outside or inside woodwork of railway or other coaches or carriages, glass, stone, or other finished or polished surfaces will readily and completely remove any greasy, sulfurous, or other deposited matter therefrom, leaving the original surface intact, and which composition at the same time shall not injuriously affect any metal adjacent to or forming part of such surface.

In carrying the invention into effect we form a compound of lemons or lemons and oranges, limes, or similar acid fruits. It is preferable, however, where different kinds of fruit are employed that one-half of the total weight of fruit should be lemons. The next step in the formation of the compound consists in the pulping of the fruit, and this is effected by the addition thereto of a small proportion of a mineral acid, preferably hydrochloric acid, and boiling with water in a suitable vessel for a period sufficient to form a thick paste. By this time the greater part of the mineral acid will have been driven off. A suitable proportion of oxalic acid is now added together with a sufficient quantity of any form of syrup—such, for example, as black treacle, molasses, golden syrup, glucose syrup, dextrine, flour, potatoes, or the like. The mass is boiled and stirred until the desired degree of viscosity is reached, being then of a thick syrupy consistency. To the product thus obtained is added when quite cold a small proportion of butyric or any other oil or grease dissolving acid of the fatty series. For example, formic, propionic, lectic, oleic, or the like acid may be substituted for the butyric acid. The acid is well stirred in, and the mixture, if desired, may be scented with some essential oil.

In order to adapt the composition to the various purposes for which it may be employed, it is necessary that the degree of viscosity, as well as the acidity of the said composition, be varied. This, as will be readily understood, may be effected by varying the proportions of the various component ingredients.

A very suitable mixture for general use is made by first boiling the following ingredients in the proportions stated until a thick paste is formed: two pounds lemons, one pound hydrochloric acid, four pounds water. To the paste formed by the above is added two pounds oxalic acid, three pounds black treacle. When cold, one fluid ounce of butyric acid is well stirred in and sufficient water is added to make up one gallon.

In use the composition is applied by means of a brush or the like to the surface required to be cleansed and left thereon for a period varying in accordance with the thickness, age, and nature of the deposit to be removed. The exact period may be ascertained by testing the effect of composition from time to time. When it is found that the full effect has been attained, the composition is rubbed off, carrying with it the objectionable matter, and the surface, if so desired, washed with water.

In cases where it is desired to impart a polish to the cleaned surface a proportion of mineral oil not exceeding ten per cent. of the total weight is added to the composition.

Having now particularly described and ascertained the nature of the said invention and in what manner the same is to be performed, we declare that what we claim is—

1. A compound for cleaning painted or polished surfaces, comprising a boiled pulp of acid fruit and a mineral acid, combined in suitable proportions with oxalic acid and a syrup, together with a grease-dissolving acid.

2. A compound for cleaning painted or polished surfaces, comprising a boiled pulp of acid fruit and a mineral acid, combined in suitable proportions with oxalic acid and a syrup, together with a grease-dissolving acid and a mineral oil.

3. A compound for cleaning painted or polished surfaces, comprising a boiled pulp of acid fruit and hydrochloric acid and water, combined in suitable proportions with oxalic acid and a syrup, together with a grease-dissolving acid.

4. A compound for cleaning painted or polished surfaces, comprising a boiled pulp of acid fruit and hydrochloric acid and water, combined in suitable proportions with oxalic acid and a syrup, together with a grease-dissolving acid and a mineral oil.

5. A compound for cleaning painted or polished surfaces, comprising a boiled pulp of acid fruit and a mineral acid, combined in suitable proportions with oxalic acid and black treacle, together with butyric acid.

6. A compound for cleaning painted or polished surfaces, consisting of a boiled pulp of lemon fruit and hydrochloric acid and water, combined in suitable proportions with oxalic acid, black treacle, butyric acid, and a mineral oil.

In witness whereof we have hereunto set our hands in the presence of two witnesses.

EDWIN JOHN WATKINS.
WILLIAM HENRY SCREETON.

Witnesses:
FRANK DUCK,
F. F. McARDLE.